(12) United States Patent
Mistry et al.

(10) Patent No.: US 10,275,028 B2
(45) Date of Patent: Apr. 30, 2019

(54) MAGNETIC HAPTIC SYSTEM

(71) Applicant: Samsung Electronics Company, Ltd., Suwon, Gyeong gi-Do (KR)

(72) Inventors: Pranav Mistry, Cupertino, CA (US); Sajid Sadi, San Jose, CA (US); Curtis Aumiller, San Jose, CA (US); Chengyuan Wei, Dalian (CN); Iliya Tsvetomirov Tsekov, East Palo Alto, CA (US); Steven Manuel, Mountain View, CA (US)

(73) Assignee: Samsung Electronics Company, Ltd., Suwon (KR)

( * ) Notice: Subject to any disclaimer, the term of this patent is extended or adjusted under 35 U.S.C. 154(b) by 399 days.

(21) Appl. No.: 14/632,136

(22) Filed: Feb. 26, 2015

(65) Prior Publication Data

US 2016/0085304 A1 Mar. 24, 2016

Related U.S. Application Data

(60) Provisional application No. 62/053,756, filed on Sep. 22, 2014.

(51) Int. Cl.
*G06F 3/01* (2006.01)
*H01F 7/02* (2006.01)
(Continued)

(52) U.S. Cl.
CPC ............ *G06F 3/016* (2013.01); *G06F 3/0227* (2013.01); *G06F 3/0362* (2013.01); *H01F 7/0252* (2013.01)

(58) Field of Classification Search
CPC .......... H03N 11/00; H01H 3/08; H01H 19/11; H01H 19/10; H01H 5/00; H01H 25/00;
(Continued)

(56) References Cited

U.S. PATENT DOCUMENTS 5,640,862 A 1/1997 Remenicky
6,034,803 A 3/2000 Sullivan
(Continued)

FOREIGN PATENT DOCUMENTS

EP 1394666 A1 3/2004
EP 1837737 A2 9/2007
(Continued)

OTHER PUBLICATIONS

International Search Report and Written Opinion for International Application No. PCT/KR2015/009957, dated Jan. 7, 2016.
(Continued)

*Primary Examiner* — Nathan Danielsen
(74) *Attorney, Agent, or Firm* — Baker Botts L.L.P.

(57) ABSTRACT

In one embodiment, an apparatus includes a body. At least a portion of the body includes one or more instances of magnetic material. The apparatus includes a moveable element coupled to the body and separated by a distance in a first dimension from the portion of the body. The moveable element includes one or more instances of magnetic material, and is configured to move in at least a second dimension perpendicular to the first dimension while the distance between the moveable element and the portion of the body remains fixed by the apparatus. At least one instance of the magnetic material in the moveable element repels or attracts at least one instance of the magnetic material in the body.

28 Claims, 7 Drawing Sheets

(51) Int. Cl.
*G06F 3/0362* (2013.01)
*G06F 3/02* (2006.01)

(58) Field of Classification Search
CPC ...... H01H 19/005; H01H 19/20–19/24; H01H 19/54; H01H 19/56; H01H 2019/008; G06F 3/046; G06F 3/023; G06F 3/0304; G06F 3/0312; G06F 3/033; G06F 3/0346; G06F 3/0354; G06F 3/03541; G06F 3/03548; G06F 3/0362; H04N 5/378; H04M 1/23–1/236; B60K 35/00; B60K 37/00–37/06; H01F 7/0252–7/0268; G04C 3/001–3/008
See application file for complete search history.

(56) References Cited

U.S. PATENT DOCUMENTS

| | | | |
|---|---|---|---|
| 6,259,433 B1 | 7/2001 | Meyers | |
| 6,326,945 B1 * | 12/2001 | Williams, III | G06F 3/046 345/111 |
| 7,637,360 B2 | 12/2009 | Carlson | |
| 7,667,687 B2 | 2/2010 | Cruz | |
| 8,045,440 B2 | 10/2011 | Miyahara | |
| 8,752,969 B1 | 6/2014 | Kane | |
| 8,760,248 B2 | 6/2014 | Marie | |
| 8,773,503 B2 | 7/2014 | Dortch | |
| 8,789,435 B2 | 7/2014 | Xue | |
| 2003/0192449 A1 | 10/2003 | Fiske | |
| 2007/0279401 A1 * | 12/2007 | Ramstein | G06F 3/016 345/184 |
| 2008/0073131 A1 | 3/2008 | Cruz-Hernandez | |
| 2008/0197004 A1 * | 8/2008 | Ishigaki | B60K 37/06 200/336 |
| 2009/0027149 A1 * | 1/2009 | Kocijan | B25B 11/002 335/288 |
| 2009/0039740 A1 | 2/2009 | Sortore | |
| 2010/0020042 A1 * | 1/2010 | Stelandre | B60K 35/00 345/174 |
| 2010/0072051 A1 | 3/2010 | Zhao | |
| 2010/0319479 A1 | 12/2010 | Sjolin | |
| 2011/0090146 A1 * | 4/2011 | Katsurahira | G06F 3/03545 345/156 |
| 2012/0228111 A1 * | 9/2012 | Peterson | H03K 17/962 200/600 |
| 2014/0125471 A1 | 5/2014 | Organ | |
| 2014/0184002 A1 | 7/2014 | Levin | |
| 2014/0184505 A1 * | 7/2014 | Fullerton | G06F 1/169 345/158 |
| 2014/0207407 A1 * | 7/2014 | Liang | G01B 7/003 702/150 |

FOREIGN PATENT DOCUMENTS

| | | | |
|---|---|---|---|
| JP | 2006-244885 | | 9/2006 |
| JP | 2006244885 A | * | 9/2006 |
| JP | 2007-257996 | | 10/2007 |
| JP | 2007257996 A | * | 10/2007 |
| JP | 2007-299751 | | 11/2007 |
| JP | 2007299751 A | * | 11/2007 |
| JP | 2012-195150 | | 10/2012 |
| JP | 2012195150 A | * | 10/2012 |

OTHER PUBLICATIONS

Extended European Search Report for Application No. 15843556.0-1216, dated Mar. 23, 2018.
Communication Pursuant to Article 94(3) for EP Application No. 15843556.0-1216, dated Oct. 8, 2018.

* cited by examiner

MAGNETIC HAPTIC SYSTEM

RELATED APPLICATION(S)

This application claims the benefit, under 35 U.S.C. § 119(e), of U.S. Provisional Patent Application No. 62/053,756, filed 22 Sep. 2014, which is incorporated herein by reference.

TECHNICAL FIELD

This disclosure generally relates to magnetic haptic systems.

BACKGROUND

A system may provide haptic sensations to a user moving a portion of the system. For example, a detent in a device may be used to mechanically resist or arrest the rotation of a wheel, axle, or spindle. A detent may provide a user of the device with feedback regarding the motion of the wheel and the position of the wheel. Detents in a device may be positioned at regular or irregular increments, and the wheel may move relatively freely between those detent positions. For example, a scroll wheel in a mouse may produce "clicks" at detent positions of the scroll wheel, and may rotate freely between those detent positions. Functionality associated with movement may refer to detent positions. For example, a volume knob for a speaker system may discontinuously alter the volume of the speakers only at specified detent positions, or may continuously alter the volume as the knob rotates between and through detent positions. In either case, the detents provide information to a user about the position and rotation of the knob.

DESCRIPTION OF EXAMPLE EMBODIMENTS

Figure 1:
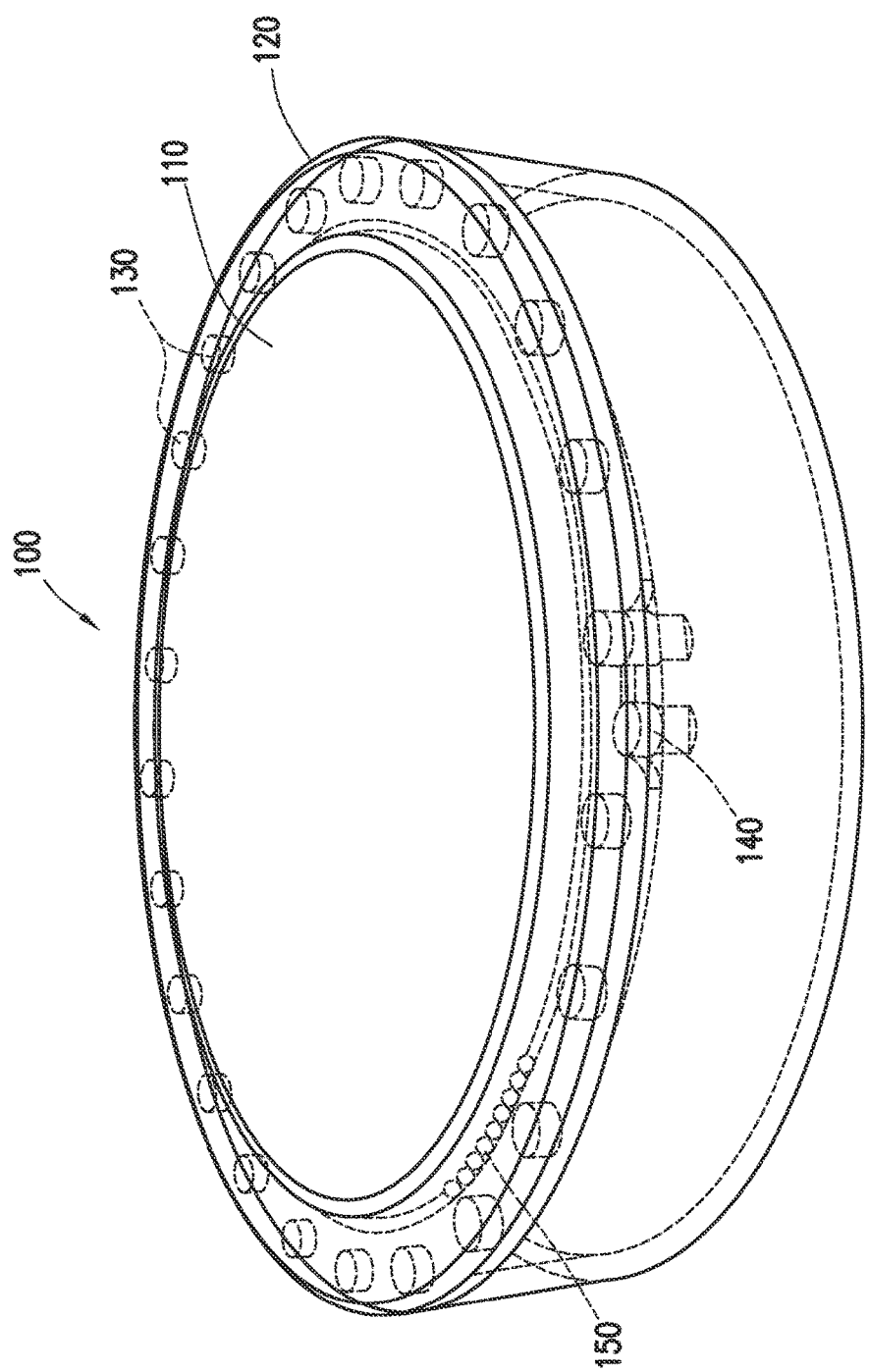
FIG. 1 illustrates an example magnetic detent system.

FIG. 1 illustrates an example magnetic detent system 100. In the example of FIG. 1, system 100 includes a body 110 and a moveable element 120 that moves relative to body 100. As illustrated by FIG. 1, in particular embodiments device body 110 may have a circular shape. For example, device body 100 may be an axle about which a knob rotates, for example to provide volume adjustment for a sound system. In particular embodiments, device body 110 may include a display. For example, device body 110 may form part of a watch or a smart-watch system. This disclosure contemplates that the descriptions herein may be used for the smart watch, or any embodiment thereof, disclosed in U.S. Patent Application Publication No. 2014/0143737, which is incorporated by reference herein in its entirety. Moreover, while this disclosure describes examples of specific types of magnetic detent systems 100 and device bodies 110, this disclosure contemplates any suitable magnetic haptic systems having any suitable device bodies. For example, a device body may be a rail and a moveable element may be a slider.

A portion of device body 110 may include one or more instances of magnetic material 140. As used herein, "magnetic material" may refer to any suitable magnetic material, such as material that produces a magnetic moment in response to an external magnetic field (such as, for example, a paramagnetic or ferromagnetic material); a material that exhibits a magnetic moment in the absence of an external magnetic field (e.g., a permanent magnet such as a magnetized ferromagnetic material at an appropriate temperature); a material that exhibits a magnetic moment as a result of an applied electric current (e.g., an electromagnet, such as an electropermanent magnet); or any suitable combination thereof. This disclosure contemplates any suitable method of depositing or including magnetic material in or on a moveable element or a portion of a device body. For example, magnetic material may be printed or otherwise patterned onto a surface in any suitable shape. As another example, magnetic material may include one or more pre-formed magnetic materials, such as discrete permanent magnets, that are subsequently introduced in or on a structure.

Magnetic material 140 of device body 110 may have a net magnetic moment that creates a magnetic field in the vicinity of magnetic material 140. Thus, magnetic material 140 may interact with the magnetic moments of magnetic material 130 in moveable element 120 as magnetic material 130 is moved by moveable element 120 into the vicinity of magnetic material 140. For example, in FIG. 1 moveable element 120 may be a rotatable ring that rotates relative to device body 110. In particular embodiments, moveable element 120 may be affixed to body 110 by any suitable structure, for example by snapping on to the device body or by resting on one or more ball bearings 150. Moveable element 120 may be rotated on a low-friction bearing surface, such as, for example, a plain bearing. In particular embodiments, moveable element 120, a bearing portion of device body 110, or both may be made of a smooth plastic material that has suitable glide characteristics. In particular embodiments, moveable element 120, a bearing portion of device body 110, or both may be made of a smooth metal that has suitable glide characteristics. In particular embodiments, moveable element 120 and a bearing portion of device body 110 may be made of different materials. For example, moveable element 120 may be made of plastic while a bearing portion of device body 110 may be made of a smooth metal. In particular embodiments, movement of moveable element 120 may be facilitated by one or more ball bearings 150 in a groove of device body 110. In particular embodiments, at least some of the ball bearings can be replaced with a lubricating material ring (such as Teflon or Delrin). Reducing the friction between a moveable element and a device body may increase or emphasize the sensations caused by detents. This disclosure contemplates any suitable method of facilitating low-friction movement of a moveable element relative to a portion of a device body.

When moveable element 120 is rotated about body 110, instances of magnetic material 130 in moveable element 120 may pass over or near instance of magnetic material 140 in body 110. The magnetic moment of magnetic material 130 interacts with the magnetic moments of magnetic material 140, creating a haptic sensation to a user as the user rotates moveable element 120. In particular embodiments, magnets 130 and 140 may be positioned such that as magnets 130 pass near magnets 140, their magnetic moments are substantially parallel to each other, whether pointing in the same direction or pointing in the opposite direction. In other words, in those embodiments, the absolute value of the cross product of the magnetic moment vectors may be relatively small compared to the absolute value of the dot product of the magnetic moments. This disclosure contemplates that the magnetic moments of magnetic material in a magnetic haptic system may point in any suitable dimension. For example, as illustrated in FIG. 1, magnetic material 130 may be oriented such that the magnetic moments of magnetic material 130 point in a dimension that is substantially perpendicular to the plane of the moveable element 120, i.e., substantially perpendicular to a radial dimension (and to an angular dimension in the plane of rotation) of moveable element 120 and parallel to an axial dimension of moveable element 120. Similarly, magnetic material 140 of device body 110 may be orientated such that magnetic moments of magnetic material 140 substantially point in the dimension perpendicular to the plane of the moveable element 120. As another example, instances of magnetic material 130 may be oriented such that the magnetic moments of magnetic material 130 substantially point in a radial dimension of moveable element 120. Instance of magnetic material 140 may likewise be oriented such that the magnetic moments of those instances point in the radial direction. For example, moveable element 120 may encircle the portion of device body 110 containing magnetic material 140. As another example, moveable element 120 may sit inside a circular portion of device body 110 that contains magnetic material 140. This disclosure contemplates any suitable orientation of magnet materials and magnetic moments in a magnetic haptic system, including but not limited to any orientation in a plane formed by the axial and radial dimensions of moveable element 120.

In particular embodiments, magnetic material 130 may include instances of magnetic material with magnetic moments that point in substantially opposite directions. For example, one instance of magnetic material 130 may have a magnetic moment that substantially points in an axial dimension of device and another instance of magnetic material 130 that has a magnetic moment that substantially points in the same dimension but in the opposite direction. As used herein, magnetic material that has magnetic moments that point in the same dimension but in substantially opposite directions may be referred to as having opposite polarity. In particular embodiments, magnetic material 140 may include instances of magnetic material with magnetic moments that point in substantially opposite directions. In particular embodiments, either or both of magnetic material 130 and magnetic material 140 may include alternating instances of magnetic material with opposite polarity. As one example, magnetic material 130 may include first instances of magnetic material that have magnetic moments pointing in an axial dimension and second instances of magnetic material that have magnetic moments pointing in the same dimension but in the opposite direction. The first instances and second instance may be placed at alternating positions in moveable element 120. In those embodiments, as moveable element 120 rotates about device body 110 the first and second instances repel and attract magnetic material 140, respectively, assuming that the magnetic moment of magnetic material 140 stays relatively constant as moveable element 120 rotates.

Figure 2:
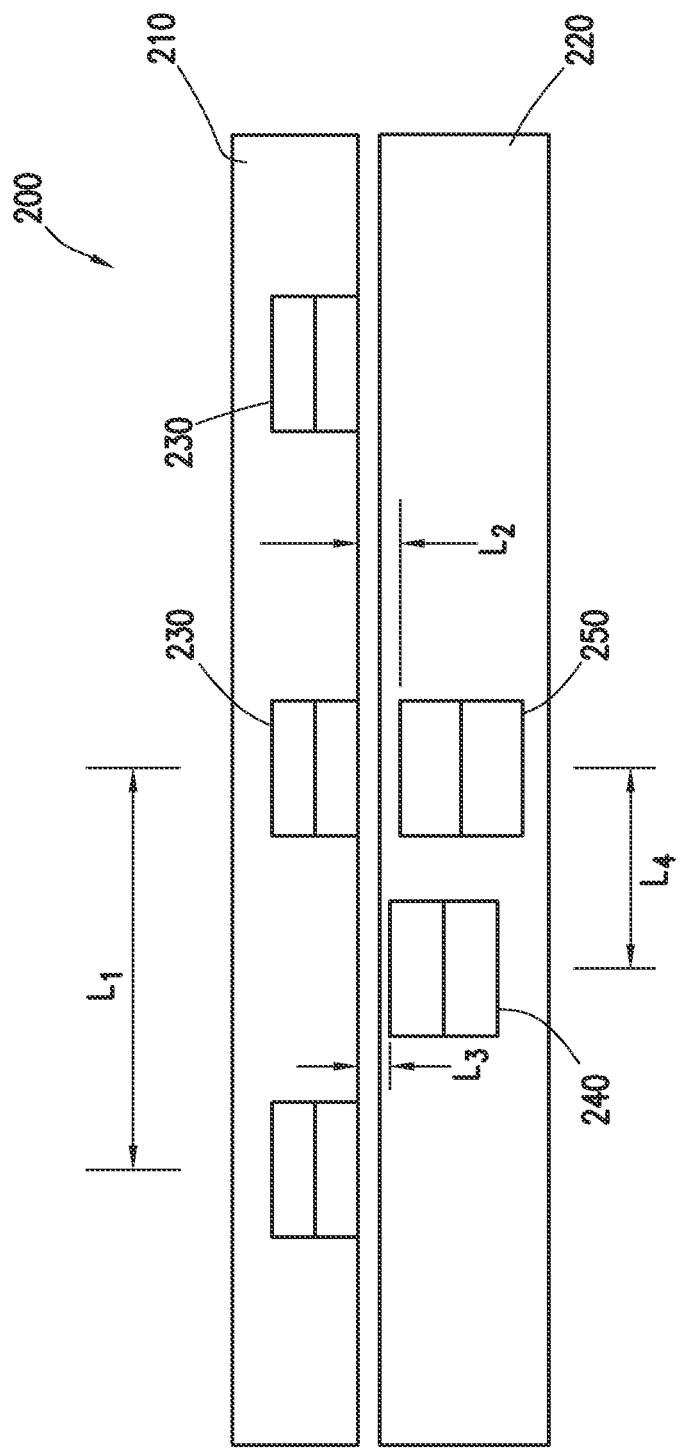
FIG. 2 illustrates a cross section of an example magnetic haptic system.

FIG. 2 illustrates an example of a haptic magnetic system 200, such as for example the magnetic detent system of FIG. 1. Haptic magnetic system 200 may include a moveable element 210 coupled to a device body, which includes a portion 220. Portion 220 may include magnetic material 240 and 250, and moveable element 210 may include magnetic material 230. Instances of magnetic material 230 may be separated by a distance $L_1$. In particular embodiments, $L_1$ may be constant between some of all of magnetic material 230. For example, instances of magnetic material 230 may be evenly spaced across moveable element 210 or of a portion of moveable element 210. In particular embodiments, $L_1$ may vary between instances of magnetic material 230. Instances of magnetic materials 240 and 250 may be separated by a distance $L_4$, which may be based on $L_1$. For example, in particular embodiments $L_4$ may be one-half of $L_1$. As for $L_1$, $L_4$ may vary or be constant between specific instances of magnetic materials 240 and 250.

In particular embodiments, moveable element 210 may be separated from portion 220 of a device body by gap. The gap may allow moveable element 220 to move relative to portion 220 without producing friction between the two elements. The gap is small enough so that magnetic moments of magnetic material 230 interact with magnetic moments of magnetic material 240 and 250 as magnetic material 230 passes by magnetic materials 240 and 250. In particular embodiments, some or all of magnetic material 230, 240 and 250 may be flush against a surface of moveable element 210 and portion 220, respectively, nearest the gap separating moveable element 210 and portion 220. In other words magnetic material 230 and magnetic material 240 and 250 may be separated by the same gap that separates moveable element 210 and portion 220 of a device body. In particular embodiments, instances of magnetic material 230, instances of magnetic material 240, instances of magnetic material 250, or any suitable combination thereof, may be offset by a distance from the surface of the component in which those magnetic materials reside. For example, in the example of FIG. 2, magnetic material 240 is offset from the surface of portion 220 such that magnetic material 230 and magnetic material 240 are separated by a distance $L_3$, which is larger than the gap separating moveable element 210 and portion 220. In the example of FIG. 2 magnetic material 250 is offset by a distance $L_2$, which is larger than $L_3$. Thus, all else being equal, the magnetic interaction—and thus haptic sensation—produce when magnetic material 230 passes near magnetic material 250 may be less than the haptic sensation produced when magnetic material 230 passes near magnetic material 240. This disclosure contemplates a magnetic haptic system having any suitable offsets, distances separating any suitable instances of magnetic material, and any suitable gap separating a moveable element and a portion of a device body. For example, this disclosure contemplates that in particular embodiments, one or more instances of magnetic material may protrude past any portion of a surface of the element in which the magnetic material resides, provided that instances of magnetic material do not collide as they pass near each other.

In particular embodiments, magnetic material may be offset relative to other magnetic material such that the magnetic moments of the magnetic material, while pointing in the same dimension, are offset relative to each other in plane perpendicular to that dimension. For example, referring to FIG. 2, instances of magnetic material 230 may be offset relative to instances of magnetic material 230, 240, 250 or any suitable combination thereof. The offset may be in a dimension perpendicular to the plane of the image, i.e. towards or away from the viewer. In particular embodiments, any instance of magnetic material 230, 240, 250, or any suitable combination thereof may be offset from any other instances. In particular embodiments, offsets may be achieved by placing discrete instances of magnetic material offset relative to other magnetic material. In particular embodiments, offsets may be achieved by printing (or otherwise patterning) magnetic material with a different shape relative to other magnetic material, or magnetizing different portions of magnetic material relative to other portions of magnetic material.

The haptic sensation provided by a magnetic haptic system, such as the example system 200 of FIG. 2, may depend on several factors, including but not limited to the size magnetic material, the shape of magnetic material, the type of magnetic material, the strength of magnetic moments of instances of magnetic material, the distances between magnetic material, the angle between instances of interacting magnetic moments, the offset of the magnetic moments relative to each other, and any suitable combination of those factors. In particular embodiments, some or all of the parameters may be determined at the time of manufacturing the magnetic haptic system. For example, the shape, location, and/or magnetic strength of instances of magnetic materials may be selected, printed, or otherwise patterned during the manufacturing process. In particular embodiments, some or all of the parameters may be adjustable by a user of the device or automatically by the device. For example, when an instance of magnetic material is an electromagnet, the strength of the magnetic moment of that instance may be adjusted by a user. In particular embodiments, multiple instances of magnetic material may be adjustable by a user of by a device, providing a variety of haptic sensations as a moveable element moves relative to the device. As another example, the distance between instances of magnetic material may be changed, for example the distances $L_1$, $L_2$, $L_3$, or $L_4$ depicted in FIG. 2, or any suitable combination thereof. Some of all of those parameters may be dynamically adjusted by a user or a device, and those adjustments may provide different haptic sensations to the user. In particular embodiments, a user may indicate the haptic sensation desired by the user, and the device may automatically adjust one or more parameters to achieve the desired sensation. In particular embodiments, a moveable element, such as moveable element 120 of FIG. 1, may be detachable from the device. For example, the moveable element may snap or clip on to the device, and a user of the device may easily remove and replace the moveable element (for example, without special tools or only needing simple tools such as a screwdriver). Thus, the user may be provided with different haptic sensations associated with different moveable elements that have instances of magnetic material with different parameters.

The parameters discussed above influence the haptic sensations as a user moves a moveable element relative to a device body. The haptic sensations result from force (or torque) profiles that are themselves a function of those parameters. In particular embodiments, the parameters may provide a torque profile that is similar to the derivative of a Gaussian function when interacting magnetic moments of the same polarity are by each other (e.g., at a detent) and has a roughly linear gradient when magnetic moments of opposite polarity are only weakly interacting, if at all (e.g., between detents). In particular embodiments, magnetic material in a moveable element passing over magnetic material with opposite polarity in a device body may provide a force profile, and thus a haptic sensation, similar to sliding a relatively frictionless object over a raised surface, e.g. a "hill." As another example, magnetic material in a moveable element passing over magnetic material with the same polarity in a device body may provide a force profile, and thus a haptic sensation, similar to sliding a relatively frictionless object into a depression, e.g., a "valley." The shape of the "hill" or "valley" may depend on several parameters. For example, the size of the hill or valley is influenced by the strength and alignment of the magnetic moments in the interaction, and by the distance between them. Thus, using strong magnets (or using strong magnets and relatively magnetizable material) or decreasing the separation between a moveable element and magnetized portion of a device body may provide a relatively more sudden change in force, which may be analogous to the steepness of the corresponding hill or valley in the force of torque profile. As another example, using magnetic material that has a gradually increasing magnetic moment as a function of the distance in the direction of movement may represent a force profile similar to a hill or valley with a relatively low steepness. As another example, decreasing the distance between magnetic material in the same element, such as in element 210 or portion 220 of device body (or both), may increase the frequency of the haptic sensations provided. As another example, offsetting the magnetic moments of interacting magnetic material may decrease the strength and sharpness of the interaction. As another example, the shape of magnetic material may affect the shape of the force profile and thus the haptic sensation provided to a user. Referring to FIG. 2, in particular embodiments increasing $L_4$ may decrease detent stiffness and increase the backlash feel. In particular embodiments, increasing $L_3$ decreases the sharpness of the torque profile near magnetic material 250. In particular embodiments, increasing the amount of magnetic material in in a direction of the dimension of $L_3$ (i.e., increasing the thickness of the magnetic material) results in greater torque amplitudes and increased spread of the torque profile. In particular embodiments, increasing the amount of magnetic material in a direction of the dimension of $L_1$ (i.e. increasing the width of magnetic material) results in greater torque amplitude and increased spread of the torque curve. In particular embodiments, altering the thickness of magnetic material may affect torque amplitudes more than altering the width of magnetic material. In particular embodiments, altering the thickness of magnetic material may affect spread of the torque curve less than altering the width of magnetic material.

In particular embodiments, the relationship between thickness and increased torque is not linear. For example, a 50% reduction of thickness of an instance of magnetic material may result in only a 40% to 45% decrease in the torque profile near that magnetic material. In particular embodiments, reducing the thickness of an instance of magnetic material may increase the steepness of the torque profile near the magnetic material. In particular embodiments, a magnetic haptic system that includes magnetic material of alternating polarity may increase restoring forces between detent positions. In particular embodiments, an instance of magnetic material, such as instance 240 in FIG. 2, may be distributed across (i.e. on either side of) magnetic material 250 to provide the same haptic sensations provided in the illustration of FIG. 2. For example, suppose that instance 240 is a rectangular cuboid and has a width w in the same dimension in which length $L_4$ resides. If $L_1$ is constant for a given set of instance of magnetic material 230, then instance 240 may be divided into two identical instances on opposite sides of instance 250, each identical instance having a width of one-half w and centered a distance $L_4+w/4$ from instance 250. In that embodiment, the resulting contributions to the torque profile of the two instances on either side of instance 250 may sum linearly, thus providing the same haptic sensation to a user of the magnetic haptic system of FIG. 2 as the embodiment depicted in FIG. 2. In particular embodiments, instance 240 may take other shapes (such as, for example, a cylinder) for which equal halves placed as in the embodiment described above will provide the same total effect as a whole cylindrical instance 240 placed as depicted in FIG. 2. In particular embodiments, portions of an instance 240 may simulate the same effect as an entire instance 240 even if the portions take on different shapes, provided that the portions are situated such that the effect of the portions on instances 230 is identical to the effect of the single instance 240 on the instances 230. In particular embodiments, discrete distributed magnets may collectively simulate a torque or force profile of a single magnet that has a more complex shape and internal field strength than any of the discrete magnets have.

Figure 3B:
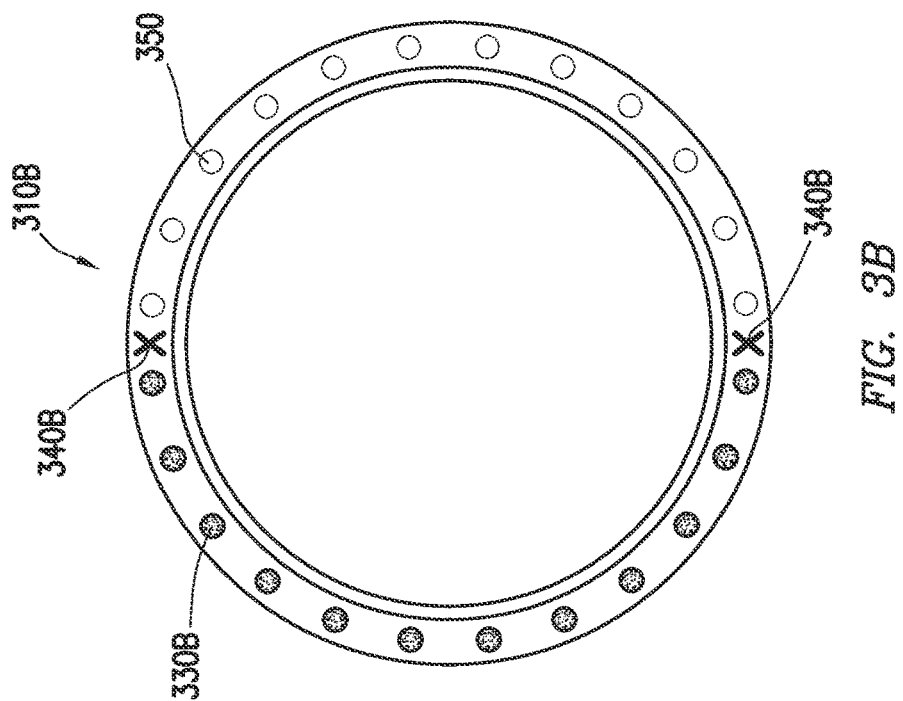
FIGS. 3A and 3B illustrate example detent placements in an example magnetic detent system.
Figure 3A:
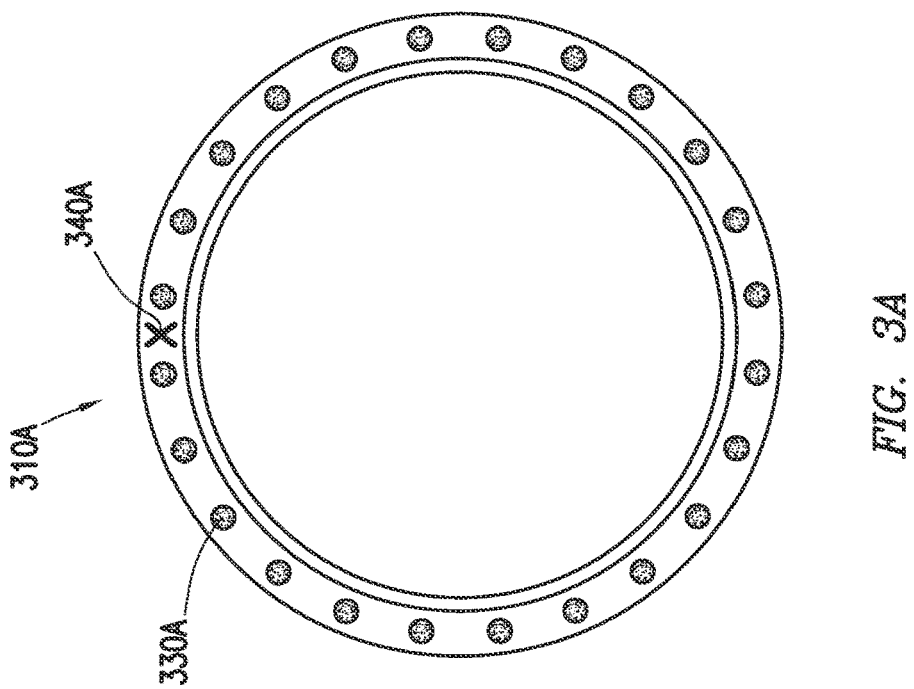

A moveable element and/or a portion of a device body may have any suitable instances of magnetic material in any suitable configuration. In particular embodiments, haptic sensations may be affected by the number and configurations of those instances. In particular embodiments, haptic sensations associated with different layouts may be similar. FIGS. 3A and 3B illustrate two example configurations that have similar haptic profiles. FIGS. 3A and 3B illustrate a top-down view of example detent placements in an example magnetic detent system that includes a rotatable element, such as for example moveable element 120 of FIG. 1. As illustrated in FIG. 3A, rotatable element 310A may include instances 330A of magnetic material. Rotatable element 310A includes 24 instances 330A that are evenly spaced apart, i.e. 15 degrees from each other. In the example of FIG. 3A, rotatable element 310A rotates above a portion of a device body that includes magnetic material 340A. Thus, a haptic sensation (whether corresponding to a hill, valley, or any other suitable force or torque profile) occurs when an instance 330A passes by magnetic material 340A. As illustrated in FIG. 3A, in particular embodiments a device body may include only one magnet and a moveable element may include more than one magnet. In particular embodiments, a moveable element may include only one magnet and a device body may include more than one magnet. This disclosure contemplates that a haptic sensation that may be accomplished by a particular configuration of first magnetic material in a moveable element and second magnetic material in a device may be accomplished by placing the second magnetic material in the moveable element and the first magnetic material in the device.

While the magnetic haptic system of FIG. 3A includes 24 instances 330A of magnetic material in a moveable element 310A and one instance of magnetic material 340A in a device, a similar haptic profile may be accomplished by the configuration of FIG. 3B. FIG. 3B illustrates 12 instances 330B of magnetic material in a moveable element 310B. The instances 330B having the same spacing between them as the instances 310A in FIG. 3A. However, instances 330B are on only one half of rotatable element 310B, and no instances are used in corresponding positions 350 on the other half of moveable element 310B. Moveable element 310B rotates over a device body that has two evenly spaced (i.e., 180 degrees of spacing) instances 340B of magnetic material. A given rotation of moveable element 310B results in the same number and frequency of interactions as the same rotation of moveable element 310A (i.e., in both figures an interaction occurs every 15 degrees of rotation). All else being equal, the configuration of FIG. 3B thus creates the same haptic feedback sensation to a user of a device as the configuration of FIG. 3A. As another example, a third (relative to the example of FIG. 3A) of the magnets in the rotatable element may be used if the number of magnets in the device body is tripled (again, relative to the example of FIG. 3A), as long as the magnets in the rotatable element maintain the same relative spacing and the magnets in the portion of the device body are evenly spaced about the portion. In general, if a first haptic profile may be accomplished with N magnets in a moveable element (spaced with a spacing S) and M evenly spaced magnets in a device body (or vice versa), then all else being equal, the same sensation may be achieved by retaining N/I magnets in the moveable element with spacing S and including I*M evenly spaced magnets in the device body. FIGS. 3A and 3B illustrate the use case where N=24, S=15 degrees, M=1, and I=2, although this disclosure contemplates any suitable values for those parameters resulting in any suitable configurations. For example, as long as the same number of magnet pairs are interacting during a given incremental movement, then, all else being equal, the haptic sensation provided by two different configurations will be the same. For instance, while the above examples describe symmetrical arrangement of magnets, an asymmetrical configuration may produce the same sensation as a symmetrical configuration. For example, magnetic material (such as magnetic material in moveable element 310B) may be placed in alternating positions, but all around the circumference of moveable element 310B. Instances 340B of magnetic material may then be placed in any two consecutive positions, or in any other positions such that instances 340B are separated by an even number of (evenly spaced) empty positions.

Figure 4:
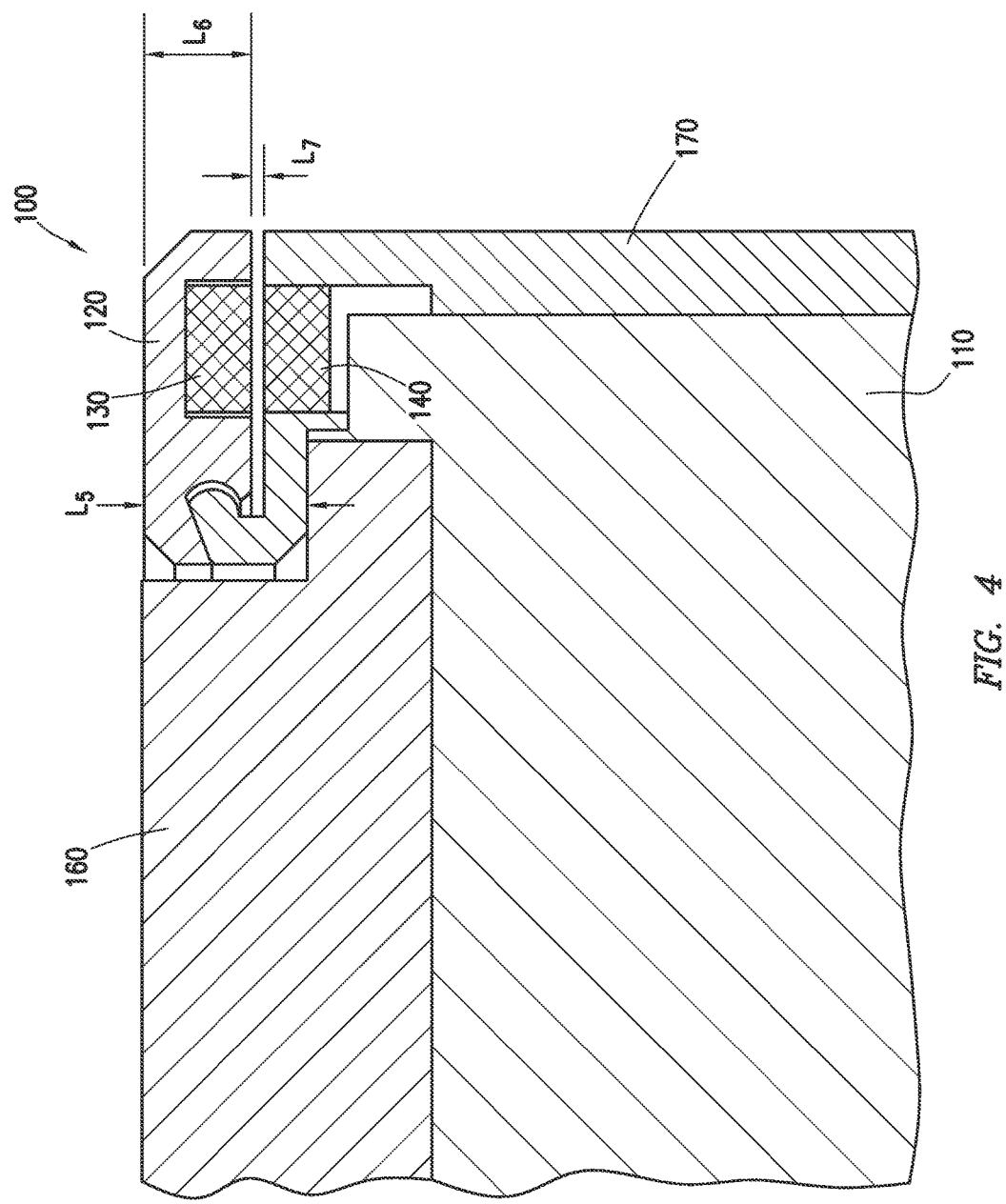
FIG. 4 illustrates a cross section of the example magnetic detent system of FIG. 1.

FIG. 4 illustrates a cross section of the example magnetic detent system 100 of FIG. 1. System 100 includes a moveable element 120 with instances of magnetic material 130, and a device body 110 that includes a portion 170 that has instances of magnetic material 140 below moveable element 120. Device body 110 includes a display 160. As discussed above a gap such as gap $L_7$ resides between moveable element 120 and portion 170 of device body 110. $L_7$ may be, for example, approximately 15 millimeters. In particular embodiments, portion 170 may include a lip or ridge a distance $L_5$ from the top of moveable element 120, such as for example approximately 1.9 millimeters. The ridge may support the attachment of moveable element 120 to device body 110. In particular embodiments, moveable element 120 may have a thickness $L_7$ of, for example, approximately 1.3 millimeters, and a width of, for example, approximately 4 millimeters. In particular embodiments, some or all instances of magnetic material 130, 140, or both may have a thickness of approximately 0.8 millimeters and a diameter (if substantially circularly shaped, as in the example of FIG. 1) of approximately 1.6 millimeters (i.e., a diameter of twice the thickness).

In particular embodiments, the gap between a moveable element and a portion of a device body results in little physical contact between the ring and the device, resulting in relatively little friction as the moveable element is moved relative to the device. In particular embodiments, the gap between the surfaces of a moveable element and a device body may be sealed from the environment, thus reducing the amount of contaminants that enter the gap. However, one benefit of a magnetic haptic system is that the magnetic interactions are relatively impervious to contaminants (such as, e.g., water) as the magnetic fields produced by magnetic moments can typically pass through such contaminants. In particular embodiments, one or more instances of magnetic material in a moveable element, in a portion of a device, or both, may include "floating" magnetic material that can move in response to a magnetic field. For example, if instance 140 of magnetic material in portion 170 of device 110 is floating, then the magnet may be attracted by instance 130 of moveable element 120 and click or tap the surface of portion 170 as instance 130 moves by. The click or tap may produce an audible sound to the user, which may reinforce the haptic sensation provided to the user. In particular embodiments, the floating element may be a ball bearing coupled to a spring that returns the ball bearing to its rest position after a portion of magnetic material having a net magnetic moment passes by the ball bearing. Such sounds may also be produced by a speaker system in the device.

Figure 5:
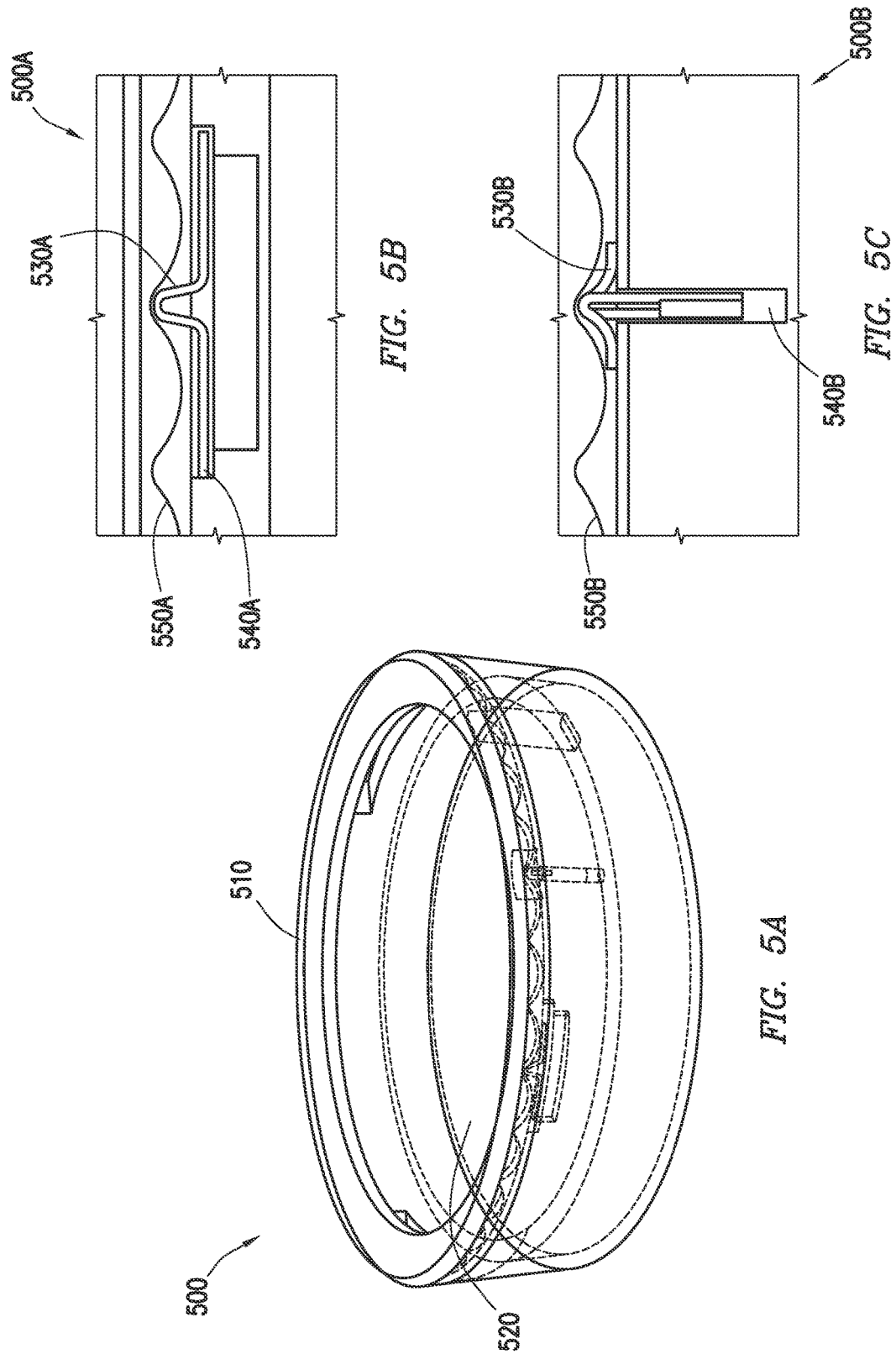
FIGS. 5A-C illustrate example spring-based detent systems.

In particular embodiments, a device that is part of a magnetic haptic system may include a detector that detects the position of a moveable element relative to the device body. This disclosure contemplates any suitable detector, such as for example an optical or mechanical detector. In particular embodiments, some or all of the magnetic materials used to provide the haptic interactions may be part of the detector system, for example by using one or more Hall-effect sensors that detect the polarity and/or intensity of the magnetic material relative to the sensors. In particular embodiments, the position of the magnetic material may correspond to one or more functionalities, such that the interactions provide not only haptic sensations, but also information to the user about the functionalities. For example, a knob for a thermostat may increase or decrease a desired temperature at detent positions, and the haptic feedback provided by the detent informs a user both of the rotation of the knob and that the desired temperature is being adjusted by an amount equal to the number of detent positions felt. As another example, a user of a smart watch may navigate among graphical user interfaces, may select settings, and may navigate through content displayed on a screen (such as, for example, menu items) using a detent system, and each detent may correspond to a particular selection or navigation. Additional details of interactions and use of a detent system for a smart watch are described in U.S. Patent Application Publication No. 2014/0143737. This disclosure contemplates any suitable functionalities associated with any suitable magnetic haptic system In particular embodiments, a spring-based haptic system may be used alternatively or in addition to a magnetic haptic system. FIGS. 5A-C illustrate examples of spring-based haptic systems. System 500 includes a device 520 with a moveable element 510. System 500 includes two vertical spring designs 500A and 500B. The designs align the spring with the wall of device 520. The force of the spring both provides detent force, as well as an upward force to counteract the user pushing down on the ring. Vertical spring design 500A includes a simple spring 530A placed in lateral pocket 540A. Spring 530A provides haptic feedback as it moves across detents cams on surface 550A. Wilted T-spring 530B uses vertical pocket 540B rather than lateral pocket 540A.

While FIGS. 5A-C illustrate two vertical spring arrangements, this disclosure contemplates any suitable spring arrangement. For example, an outward lateral spring design may align a spring along the outer circumference of a device body. This applies force sideways, which causes the spring to both act as a locking part for the top ring, and produces force perpendicular to the force of the hand resting on the ring, thus providing a more uniform detent feel. In particular embodiments, a spring may be pre-tensioned against a base of the device. In particular embodiments, the moveable element associated with a lateral spring system may be made of a relatively rigid material, for example to prevent radial force from unseating the spring or allowing it to move clear of the detents. Rings may be either metallic or metal-reinforced to overcome this issue. In particular embodiments, interior stiffeners may be used when a device body or a moveable element is made of a relatively flexible material. As another example of a lateral spring system, the springs may be attached to a moveable element and a device body may provide the detent cams. That inward-facing embodiment may require an opposite preload relative to the outward facing system and results in stiffening of the overall system.

Figure 6:
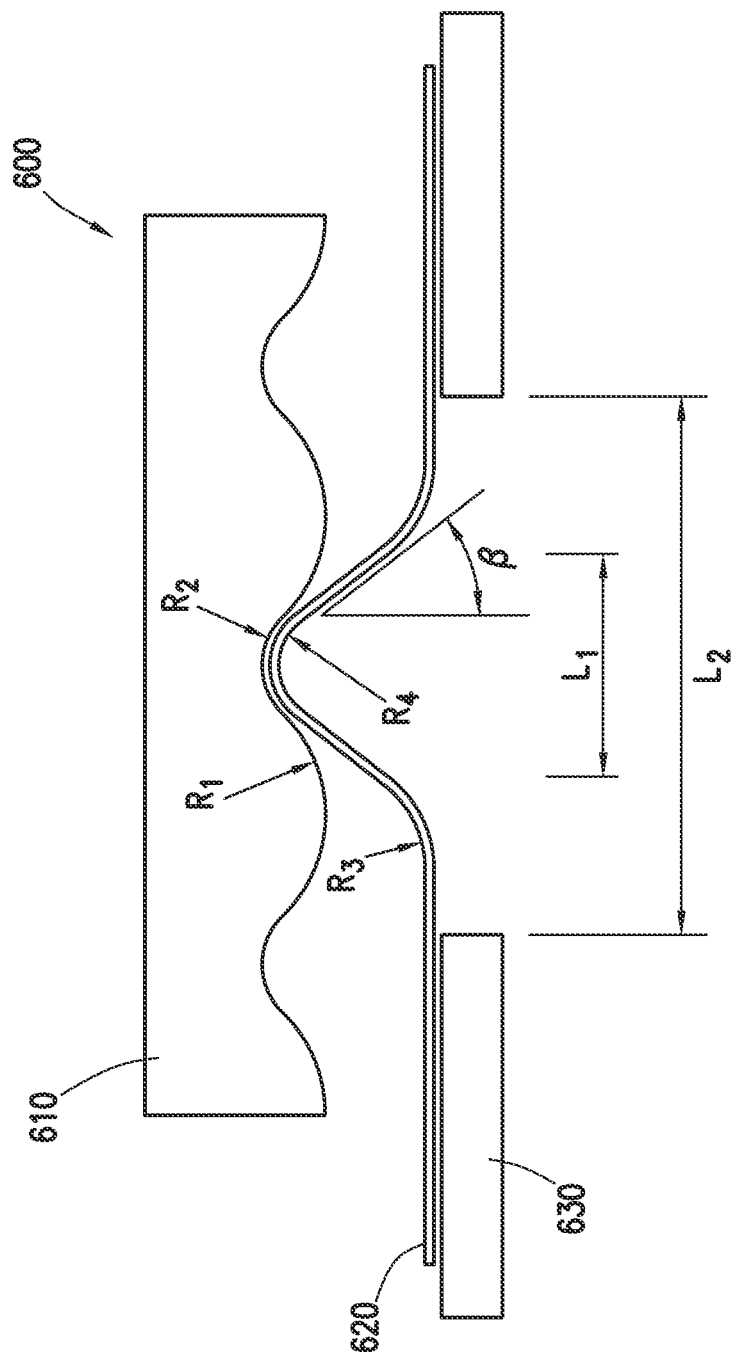
FIG. 6 illustrates example parameters for an example spring-based detent system.

As for magnetic haptic system, spring haptic systems include a number of associated parameters that influence the haptic feedback. FIG. 6 illustrates example parameters of an example spring system 600 that includes a moveable element 610, a spring 620 with spring elongation $L_1$, and a device body 630 that includes a spring relief pocket with length $L_2$. $R_2$ and $R_4$ describe the sharpness in detents, and $R_1$ and $\beta$ describe the sharpness between detents. In particular embodiments, ensuring that $R_2$ is less than $R_4$ reduces backlash in the detent. In particular embodiments, elongation $L_1$ of FIG. 6 should be limited so that the spring does not bow toward the detent cam (outward-facing spring case) or load the spring tails in compression (inward-facing case). Loading the spring in compression can result in an overall non-linear spring which becomes stiffer once the spring runs out of space to expand. In the limiting case where $\beta=0$, $L_1$ actually decreases, so there is generally a configuration with zero lengthening. As $R_3$ decreases, spring lengthening typically decreases. Decreasing $R_2$ or $R_4$ may make the moveable element click into detent positions more sharply. Decreasing $R_1$ may make the transition between detents more sharp and may make resting between detents more difficult. Decreasing $\beta$ generally increases the stiffness of the entire system, and may increase the sharpness and stiffness in the detent. In particular embodiments, the outward-facing spring configuration can include a simple spring by pre-bending $R_2$ and allowing $R_3$ to be formed by stretching the spring around the surface containing $L_2$. While this disclosure describes example parameters that may influence the haptic feedback provided by a spring haptic system, this disclosure contemplates any suitable parameters. For example, the wire gauge of a spring, such as spring 620, may affect the haptic feedback provided. For example, increasing the thickness of the wire increases the sharpness in and between detents and also increases the friction experienced at all orientations.

Figure 7:
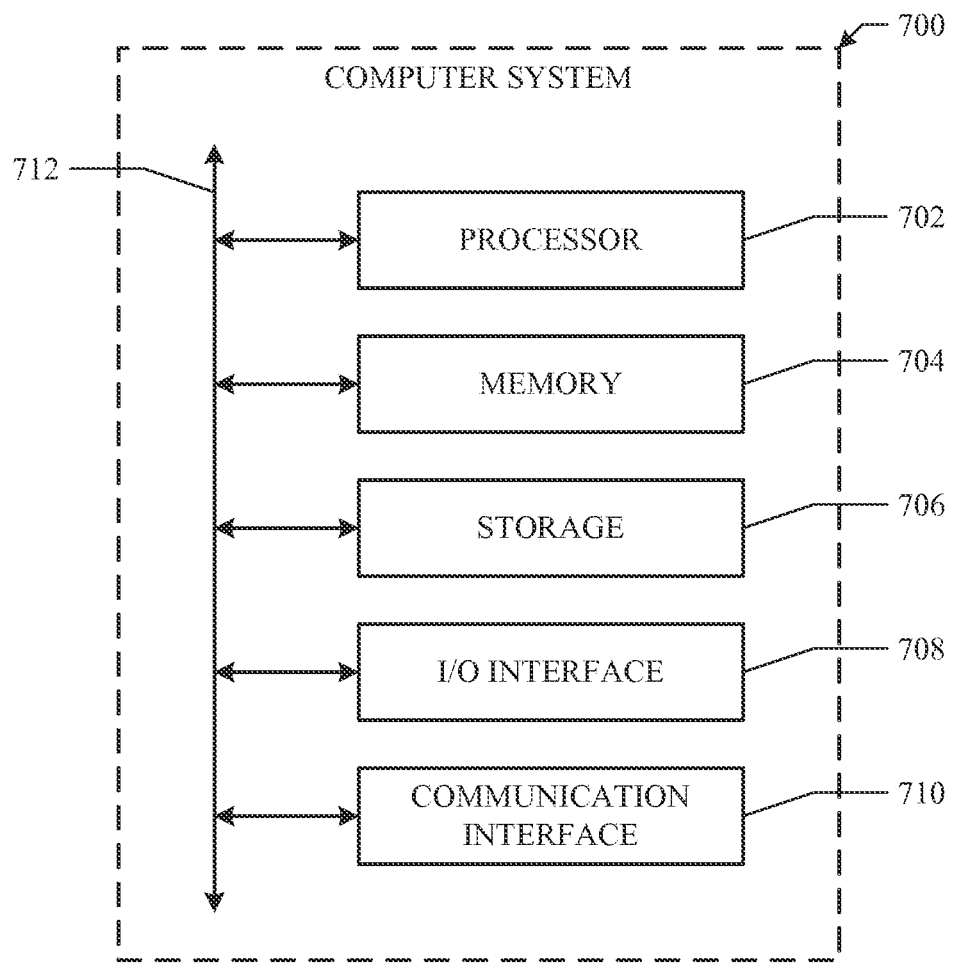
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate, and this RAM may be dynamic RAM (DRAM) or static RAM (SRAM), where appropriate. Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), body area network (BAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This scope of this disclosure encompasses all changes, substitutions, variations, alterations, and modifications to the example embodiments herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus comprising:
a body, at least a portion of the body comprising one or more instances of a first magnetic material; and
a moveable element coupled to the body and separated by a distance in a first dimension from the portion of the body, the moveable element comprising one or more instances of second magnetic material, the moveable element configured to move in at least a second dimension perpendicular to the first dimension while the distance remains fixed by the apparatus, wherein:
at least one instance of the second magnetic material repels or attracts at least one instance of the first magnetic material;
at least one of the following:
the one or more instances of the first magnetic material comprise a plurality of instances of the first magnetic material, wherein each instance of the first magnetic material is separated from an adjacent instance of the first magnetic material by a non-magnetic portion of the body; or
the one or more instances of the second magnetic material comprise a plurality of instances of the second magnetic material, wherein each instance of the second magnetic material is separated from an adjacent instance of the second magnetic material by a non-magnetic portion of the moveable element;

at least one of the following:
at least one instance of the first magnetic material is offset in a direction of the first dimension from at least one other instance of the first magnetic material; or
at least one instance of the second magnetic material is offset in a direction of the first dimension from at least one other instance of the second magnetic material; and the first magnetic material in the portion of the body or the second magnetic material in the moveable element, or both, comprises:
one or more first instances having a magnetic moment pointing in a first direction substantially parallel to the first dimension; and
one or more second instances having a magnetic moment pointing substantially opposite to the first direction.

2. The apparatus of claim 1, wherein:
the one or more first instances comprise a plurality of first instances;
the one or more second instances comprise a plurality of second instances;
each first instance is between two second instances; and
each second instance is between two first instances.

3. The apparatus of claim 1, wherein:
the body is substantially circular; and
the moveable element comprises a substantially circular element that is configured to rotate about the body.

4. The apparatus of claim 3, wherein the first dimension is substantially perpendicular to a radial dimension of the moveable element.

5. The apparatus of claim 3, wherein:
the moveable element encircles the portion of the body; and
the first dimension is substantially parallel to a radial dimension of the moveable element.

6. The apparatus of claim 5, further comprising:
within the body, a non-transitory computer-readable storage media embodying software;
one or more processors coupled to the media;
a display coupled to the body; and
a band coupled to the body.

7. The apparatus of claim 6, wherein the processors are operable to execute the software to:
determine a rotation of the moveable element; and
navigate, based on the rotation, among a plurality of graphical user interfaces for display on the display.

8. The apparatus of claim 7, wherein the processors that are operable to execute the software to navigate, based on the rotation, among the plurality of graphical user interfaces comprise processors that are operable to execute the software to transition between two of the graphical user interfaces when at least one of the instances of second magnetic material passes near at least one of the instances of first magnetic material.

9. The apparatus of claim 6, wherein the processors are operable to execute the software to:
determine a rotation of the moveable element; and
select, based on the rotation, a graphical element of a graphical user interface displayed on the display.

10. The apparatus of claim 9, wherein the processors that are operable to execute the software to select, based on the rotation, the graphical element comprise processors that are operable to execute the software to transition between two of a plurality of graphical elements when at least one of the instances of second magnetic material passes near at least one of the instances of first magnetic material.

11. The apparatus of claim 6, wherein the processors are operable to execute the software to:
determine a rotation of the moveable element; and
determine, based on the rotation, a value of a setting relating to the apparatus.

12. The apparatus of claim 11, wherein the processors that are operable to execute the software to determine, based on the rotation, a value of the setting comprise processors that are operable to execute the software to adjust the value when at least one of the instances of second magnetic material passes near at least one of the instances of first magnetic material.

13. The apparatus of claim 3, further comprising a detector configured to detect a rotation of the moveable element.

14. The apparatus of claim 13, wherein the detector comprises a Hall-effect sensor.

15. The apparatus of claim 3, wherein the moveable element is configured to be detached from the body.

16. The apparatus of claim 1, wherein at least one instance of the first magnetic material or at least one instance of the second magnetic material comprises a permanent magnet.

17. The apparatus of claim 1, wherein at least one instance of the first magnetic material or at least one instance of the second magnetic material comprises a magnetizable material.

18. The apparatus of claim 1, wherein at least one instance of the first magnetic material or at least one instance of the second magnetic material comprises an electromagnet.

19. The apparatus of claim 18, wherein a magnetic moment of the electromagnet is dynamically configurable by a user or by the apparatus.

20. The apparatus of claim 1, wherein at least one first instance of the first magnetic material comprises a floating magnetic material operable to move in a direction of the first dimension.

21. The apparatus of claim 1, wherein: the body comprises a rail; and
the moveable element comprises a slider.

22. The apparatus of claim 1, wherein the distance is dynamically configurable by the apparatus or by a user of the apparatus.

23. The apparatus of Claim 1, wherein the offset is dynamically configurable by the apparatus or by a user of the apparatus.

24. The apparatus of claim 1, wherein:
at least one instance of the first magnetic material is offset in a direction of a third dimension from at least one instance of the second magnetic material; or
at least one instance of the second magnetic material is offset in a direction of the third dimension from at least one instance of the first magnetic material,
the third dimension being substantially perpendicular to the first dimension and to the second dimension.

25. The apparatus of claim 24, wherein the offset in the direction of the third dimension is dynamically configurable by the apparatus or by a user of the apparatus.

26. The apparatus of claim 1, wherein:
the one or more instances of the second magnetic material have a magnetic moment pointing in a first direction substantially parallel to the first dimension; and
the one or more instances of the first magnetic material comprise:

one or more first instances having a magnetic moment pointing substantially opposite to the first direction; and one or more second instances comprising a magnetizable material that does not have a permanent magnetic moment.

27. The apparatus of claim 26, wherein:

each first instance is between two second instances; and each second instance is between two first instances.

28. The apparatus of claim 1, wherein:

the body is substantially circular; and the first dimension is an axial dimension with respect to the substantially circular body.

* * * * *